(12) United States Patent
Park et al.

(10) Patent No.: US 10,657,301 B1
(45) Date of Patent: May 19, 2020

(54) SYSTEMS, METHODS AND COMPUTER PROGRAM PRODUCTS FOR CONSTRUCTING COMPLEX GEOMETRIES USING LAYERED AND LINKED HEXAHEDRAL ELEMENT MESHES

(71) Applicant: National Technology & Engineering Solutions of Sandia, LLC, Albuquerque, NM (US)

(72) Inventors: Byoung Park, Albuquerque, NM (US); Barry L. Roberts, Edgewood, NM (US); Steven R. Sobolik, Albuquerque, NM (US); Moo Y. Lee, Placitas, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 431 days.

(21) Appl. No.: 15/435,904

(22) Filed: Feb. 17, 2017

Related U.S. Application Data

(60) Provisional application No. 62/296,458, filed on Feb. 17, 2016.

(51) Int. Cl.
*G06F 30/23* (2020.01)
*B29C 67/00* (2017.01)
*B33Y 10/00* (2015.01)
*B33Y 30/00* (2015.01)
*B33Y 50/00* (2015.01)

(52) U.S. Cl.
CPC .......... *G06F 30/23* (2020.01); *B29C 67/0088* (2013.01); *B33Y 10/00* (2014.12); *B33Y 30/00* (2014.12); *B33Y 50/00* (2014.12)

(58) Field of Classification Search
CPC ....................................... G06F 30/23
See application file for complete search history.

(56) References Cited

FOREIGN PATENT DOCUMENTS

CA          2427483      *    5/2002

\* cited by examiner

*Primary Examiner* — Larry W Thrower
(74) *Attorney, Agent, or Firm* — Daniel J. Jenkins

(57) ABSTRACT

Systems, methods and computer program products for creating 3D representations of bodies are disclosed. The systems, methods and computer program products include the construction of FE meshes representing complex geometries. The complex geometries may be artificially or naturally formed or designed geometries. The techniques reduce the number of elements as much as possible to save on computer run time while maintaining computational accuracy.

2 Claims, 10 Drawing Sheets

SYSTEMS, METHODS AND COMPUTER PROGRAM PRODUCTS FOR CONSTRUCTING COMPLEX GEOMETRIES USING LAYERED AND LINKED HEXAHEDRAL ELEMENT MESHES

RELATED APPLICATIONS

This application claims the benefit of U.S. Provisional Application No. 62/296,458 filed on Feb. 17, 2016, entitled "Systems, Methods and computer Program Products for Constructing Complex Geometries," the entirety of which is herein incorporated by reference.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to the field of finite analysis shape modeling, and more specifically to systems, methods and computer program products for producing finite element linked hexahedral element mesh models of bodies for analysis and fabrication.

BACKGROUND

In order to analyze, design and/or fabricate structures, parts and/or components, large-scale three-dimensional (3D) computational models have been used. These models include finite element (FE) analysis models to represent the body being analyzed. It is difficult to accurately represent these irregular geometries or spaces by a meshed mass in these computational models, and so the representation of these irregular spaces has been limited to approximations in the models.

In addition, to predict the mechanical integrity of irregular geometries using FE analysis, the 3D geometry of the structure has been found to be an essential contributor to the resulting stress conditions and so must be represented in the model as accurately as possible. For example, complex finite element analysis models have been used to evaluate the mechanical integrity of salt surrounding existing petroleum storage caverns. However, these prior models lack the precision to accurately model the caverns for some types of analysis.

The U.S. Strategic Petroleum Reserve (SPR) uses 62 salt caverns to store crude oil at four sites located along the Gulf Coast. As of 2016, the reserve contains approximately 700 million barrels (MMB) of crude oil. Most of the caverns were solution mined by the U.S. Department of Energy (DOE) resulting in irregular cavern geometry, spacing, and depth. The irregularity of the shape may be further compounded if a salt fall occurs within the cavern. Large-scale, three-dimensional computational models have been used to model the geo-mechanical behavior of these underground storage facilities. These models include simplified cylindrical shapes of the caverns for modeling purposes.

Additionally, complex shapes or parts may be modeled as simplified shapes to reduce the number of elements to save on computer run time. For example, a complex part may be modeled with less fidelity to save on computer run time, the part may then be fabricated, and a finishing process may be used to bring the part into fabrication specification.

The need remains, therefore, for systems, methods and computer program products that can more precisely model complex geometries for analysis, design and fabrication.

SUMMARY OF THE DISCLOSURE

The present invention is directed to systems, methods and computer program products that include the construction of FE meshes representing geometries or shapes. The shapes may be artificially or naturally formed or designed geometries. The systems, methods and computer program products utilize techniques that reduce the number of elements as much as possible to save on computer run time while maintaining the computational accuracy. The systems, methods and computer program products include steps and program command scripts integrated into an automated mesh generation program for the robust generation of two- and three-dimensional finite element meshes (grids) representing a shape. In an embodiment, the shapes may be simple or complex or irregular, and homogeneous or non-homogeneous. For example, the shape may be simple, such as, but not limited to a cylinder, sphere or cube. For another example, the shape may be complex, such as, but not limited to a gear, piston, or wheel. For another example, the shape may be irregular, such as, but not limited to a geologic cavern or formation, and organic body such as, but not limited to a heart or limb, and a manufactured part such as a drill or auger bit. As used in this disclosure, the term "irregular shape" means a non-symmetric 3D shape including irregular cross-sections and having no planes of symmetry.

In an embodiment, the disclosed systems, methods and computer program products may be applied to the analysis and design of complicated shapes, such as, but not limited to civil and geological structures such as mines, tunnels, faulted regions, and underground fluid injection sites; biological applications such as, but not limited to artificial limbs, bone and artery, and artificial joints. The complicated shaped masses or geometries may represent void, solid, and/or semi-solid spaces. Solid spaces are meant to include solid and liquid masses.

In another embodiment, the systems, methods and computer program products may be applied to the analysis, design and fabrication of complicated shapes, such as, but not limited to parts and devices. The analysis may be stress, strain, fatigue and creep analyses. For example, the parts may be, but are not limited to machine parts, musical instruments, molds, medical devices such as, but not limited to artificial limbs, and molds. For example, the devices or articles may be, but are not limited to tools or machines, works of art, jewelry, deformed structural components and architectural structures.

After a mesh model of the shape of a body is made by in accordance with this disclosure, known fabrication processes may be provided the model, which then may be used to fabricate the body. For example, the body may be formed by three dimensional (3D) printing, machining, tooling, mold formation and casting.

According to an embodiment of the disclosure, a method of performing a computer a finite element analysis of a body, including providing a 3D map or representation of the body, creating a finite element mesh representation of the body by the steps including dividing the body into slices, and creating elements within the slices, wherein adjacent layers of elements are connected by common nodes, and performing an action based on the created finite element mesh representation selected from a group consisting essentially of analysis, design and fabrication.

According to another embodiment of the disclosure, a system for fabricating a body including a processor for executing programming, a non-transitory computer readable storage medium encoded with the programming for creating a complex geometry. The non-transitory computer readable medium with programming is configured to receive a mapping of a body, create a finite element mesh representation of the body by the steps including dividing the body into slices, and creating elements within the slices, wherein adjacent layers of elements are connected by common nodes. The system further includes a manufacturing system that receives the finite element mesh representation of the body and manufactures a part based on the created finite element mesh representation of the body.

According to another embodiment of the disclosure, a computer program product stored on a non-transitory computer readable medium is disclosed, wherein executed by a process, the computer program product configured to create a finite element mesh representation of a body by the steps including dividing the body into slices, and creating elements within the slices, wherein adjacent layers of elements are connected by common nodes. The finite element mesh representation of the body is then analyzed by a processor.

One advantage of this disclosure is that its methodology provides for an accurate transfer of measured solid-body nodal points to a computational mesh consisting of hexahedral finite elements that maintains the integrity of the original measured geometrical data, and constructs hex mesh elements that have the required characteristics (overall dimensions, aspect ratio, convex shape, etc.) for efficient, accurate, and stable calculations.

Another advantage of the present disclosure is to provide techniques to construct meshes representing artificially and naturally formed geometries that are more accurate than simplified approximation.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
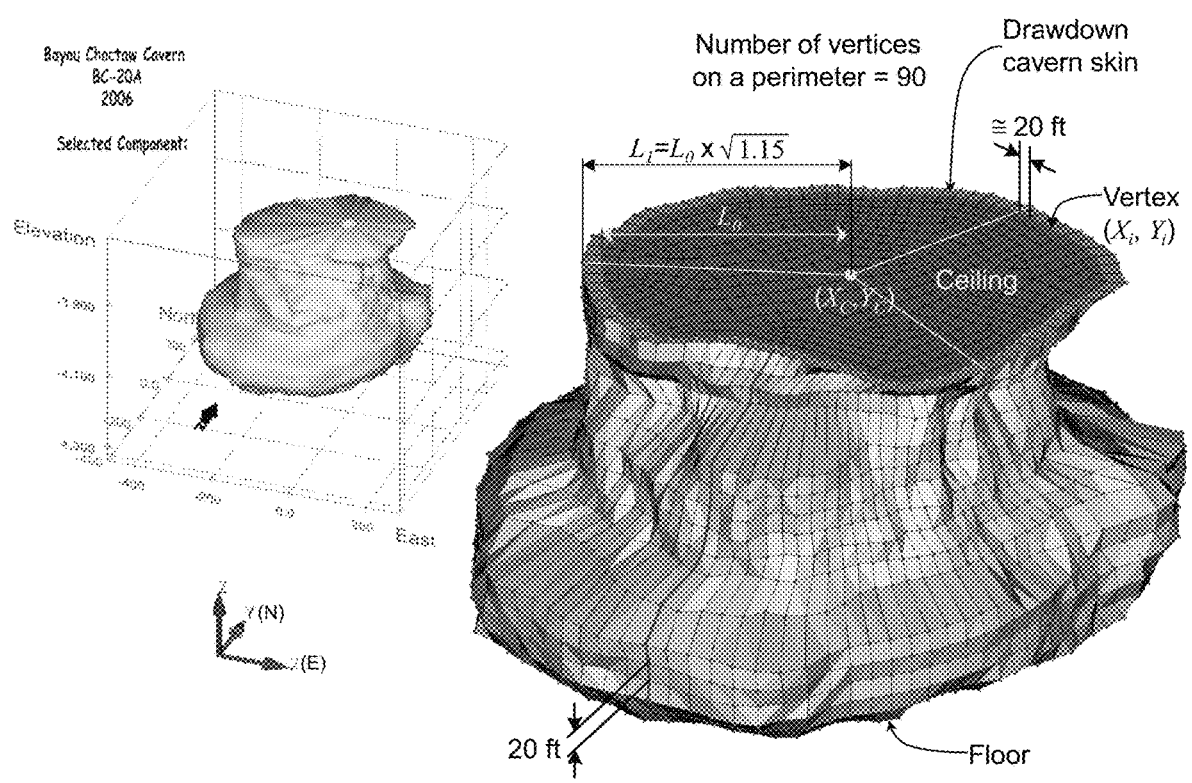
FIG. 1 shows a sonar image (left) and meshed volume (right) of Bayou Choctaw (BC) Cavern 20 with one drawdown onion layer according to an embodiment of the disclosure.

The present disclosure will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to systems, methods and computer program products that include a 3D FE mesh (which may be referred to simply as "mesh" herein) representations or models of a complex geometries. The systems, methods and computer program products include the creation of a computational mesh that approximates geometries of a space, shape or body. The geometry may be complex or irregular. The geometries may be initially mapped by tools such as, but not limited to X-ray, laser scanning, ultra-sonic, photo-analysis, borehole and well logs, sonic and seismic measuring technologies. The original mappings are then used to create a modeling mesh formed of linked, hexahedral elements. The mesh elements may be tetrahedral, hexahedral and combinations thereof.

In an embodiment, systems, methods and computer program products for the 3D geo-mechanical analyses of large underground storage facilities using a computational mesh that approximates their complex geological geometries are disclosed. Such geometries may be initially accurately mapped using sonic and seismic measuring technologies. The geometries may be initially of a first space, which may then be grown to an outer space. For example, the technique described herein may include creating a combination of data sets of mapped salt dome and cavern geometries and constructing a hexahedral element mesh that maintains the accuracy of the measurements, appropriate aspect ratios for individual elements. This model represents a first or interior or void space of the cavern. In an embodiment, adding additional geometries around caverns ("onion layers") may be added that represent the salt surrounding the cavern or the cavern walls, that may be removed by selective layer removal in the future by leaching or other removal process to expand the void or cavern space.

The process includes creating horizontal slices of the mapped geometry, creating elements for that slice, sequentially adding and assembling additional horizontal slices. The sequentially added slices include elements that have common nodes. After the creation of the first horizontal slice of a geometry, the nodal points (nodes) of that slice are mapped to the adjoining surfaces of adjacent horizontal slices, thus maintain equal spatial coordinates on co-located or common nodes. These common nodes are simplified to a single node at each coordinate location when the slices are later merged together.

The disclosed systems and methods include the following technique:
a. a mapping of a subject space or shape is performed or provided;
b. the mapped shape or space is modeled by generating horizontal slices of the mapped geometry, creating elements for each horizontal slice, and sequentially adding and assembling the horizontal slice elements. The sequentially added slices include elements that have common nodes.

In an embodiment, the process includes:
a. Inputting mapping data into a 3D data modeling and manipulation package.
b. Extracting isolevel lines which represent sample slices from the 3D data model.
c. Using software algorithms to resample the extracted isolevel lines.
d. Calculate the coordinates of onion layers and create additional layers (onion skin or layers) of material outside the original shape that qualitatively maintain the original shape while adding thickness around it. These "onion layers" are important for applications such as solution mining of caverns, where an original shape of a salt cavern containing fluid is enlarged by the introduction of fresh water. The process calculates the coordinates of these onion layers using layer thicknesses provided by the user.
e. Mesh generation of caverns and followed of salt dome, interbed, caprock, overburden, interface between dome and surrounding rock, and the surrounding rock in order.
f. Check mesh quality.
g. Assemble each mesh block to form the entire or complete FE mesh.

The technique will be discussed below as applied to a cavern space or geologic formation analysis. However, it should be apparent to one of ordinary skill in the art that the technique may be analogously used for any mapped space or body to create a FE mesh representation of that space or body for analysis, design and/or fabrication.

Finite element codes such as Sierra and Adagio, developed by Sandia Corporation, are designed to conduct simulations with finite elements that are either tetrahedral or hexahedral. Two constitutive models, i.e. power law creep (PLC) model and multi-mechanism deformation (M-D) model, are coded as material models to represent the salt behavior in Adagio. These two material models are programmed in Sierra/Adagio assuming eight-node hexahedral elements. Therefore, the mesh for the BC SPR site has to be constructed with hexahedral elements. Hexahedral elements include six convex quadrilateral sides, or facets, with the nodes for these facets being the eight nodes for the element. The cavern boundaries such as the ceiling, wall, and floor are obtained from sonar measurements, and the irregular geometries of these boundaries ultimately require various shapes of facets. Similarly, the geometry of the flank of the salt dome, obtained from seismic measurements, also consists of complicated shapes of facets. To construct a mesh with convex hexahedral elements for a geological volume keeping the complicated geometry as much as possible, the following rules were established and followed:
1. Each perimeter (cavern and dome) consists of the same number of vertices 2. Reference distance between vertices on a perimeter is:
a. about 20 ft for caverns
b. about 80 ft for dome
3. The vertical thickness of an element level is kept constant at 20 ft
4. 15% cavern volume increase for each drawdown leach.

FIG. 1 shows the meshed volume of BC-20 with the sonar image as an example. The circumference at each elevation varies. The average circumference is calculated from averaging the diameter obtained from the sonar data at each elevation. The number of intervals on a circumference is calculated to be 90 by dividing the average circumference by 20 ft, and then kept constant for each vertical layer. Thus the interval size between two vertices varies with elevation. The cavern volume consists of 90 lines from the ceiling to the floor as shown in FIG. 1. The thickness of each element level is kept constant at 20 ft. Using this rule, coordinates of each vertex are resampled from the sonar image.

Modeling of the leaching process of the caverns is performed by deleting a pre-meshed block of elements along the walls of the cavern so that the cavern volume is increased by 15 percent per drawdown. The 15% volume increase is typical for a standard freshwater drawdown, although salt quality can vary that amount. Also, typical leaching processes tend to increase cavern radius more at the bottom of the cavern than at the top, with very little change to the roof and floor of the cavern. For the purposes of this modeling effort for Bayou Choctaw, leaching is assumed to add 15% to the volume of the cavern, and is assumed to occur uniformly along the entire height of the cavern, with no leaching in the floor or roof of the caverns. Each leaching layer, or onion layer, is built around the perimeter of the meshed cavern volume using the same rules stated previously and shown in FIG. 3.

Figure 2:
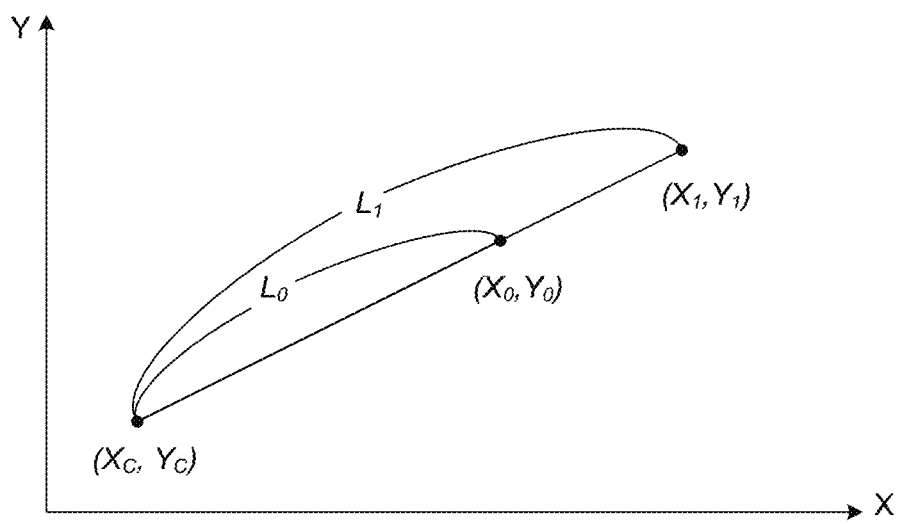
FIG. 2 shows a calculation of coordinates of a vertex for the 1$^{st}$ drawdown onion layer according to an embodiment of the disclosure.

The X-axis of model is in the E-W (East-West) direction, Y-axis is in the N-S (North-South) direction, and Z-axis is the vertical direction. To realize the leaching process in the mesh, the coordinates of a vertex $(X_1, Y_1)$ in FIG. 2 have to be calculated for the first drawdown:

The coordinates of the center at each element level are:

$$X_c = \frac{\sum_{i=1}^{N} X_i}{N}, Y_c = \frac{\sum_{i=1}^{N} Y_i}{N} \quad (1)$$

where, N=number of vertices=90 for BC-20, $X_i$, $Y_i$ are shown in FIG. 1.

The distance between the center point and a vertex $(X_0, Y_0)$ on the perimeter of original cavern volume:

$$L_0 = \sqrt{(X_C - X_0)^2 + (Y_C - Y_0)^2} \quad (2)$$

The distance between the center point and a vertex $(X_1, Y_1)$ on the perimeter of one drawdown leached volume:

$$L_1 = L_0 \sqrt{1 + R_v} \quad (3)$$

where, $R_v$=volume increase rate=15% for BC salt

Then, the coordinate of a vertex $(X_1, Y_1)$ on the perimeter of one drawdown leached volume are calculated as:

$$X_1 = X_C + (X_0 - X_C) \cdot \frac{L_1}{L_0}, Y_1 = Y_C + (Y_0 - Y_C) \cdot \frac{L_1}{L_0} \quad (4)$$

Figure 3:
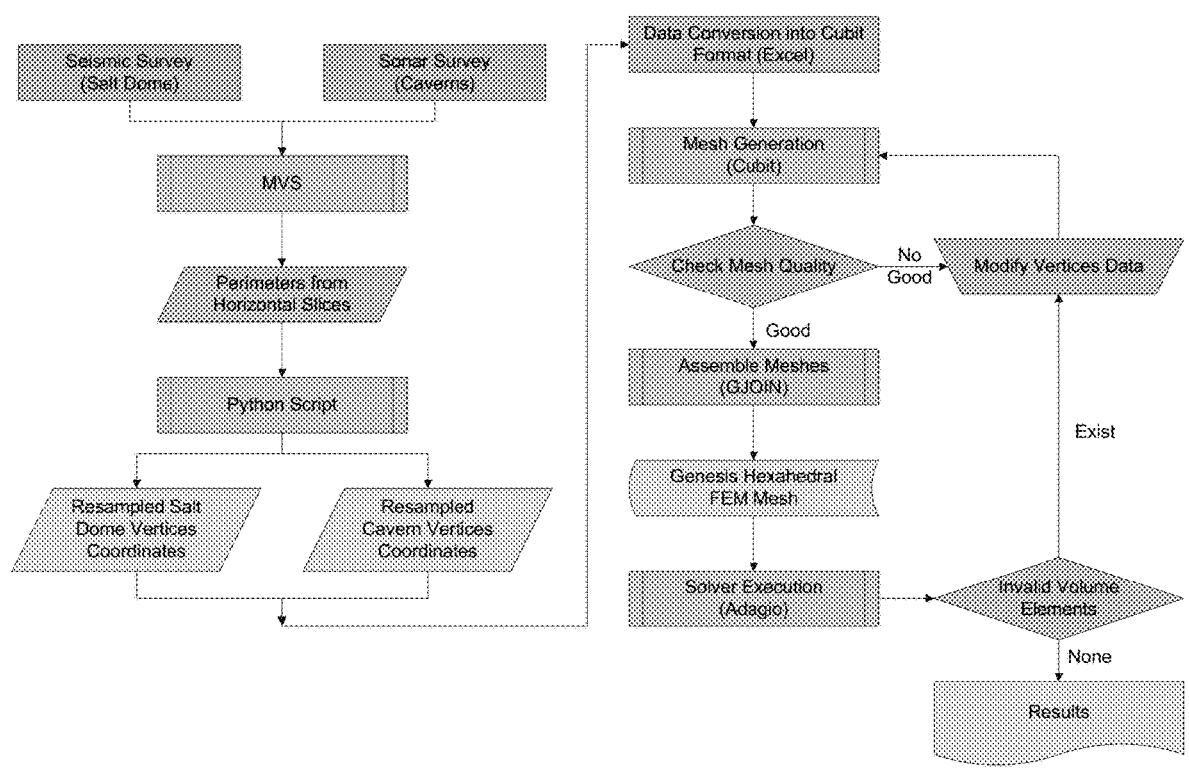
FIG. 3 illustrates a work flow for the simulation using FE mesh capturing realistic, irregular geometries of the BC site according to an embodiment of the disclosure.

FIG. 3 shows the overall work flow to construct a mesh capturing realistic geometries of the Bayou Choctaw geologic site. The BC 3D seismic data was shot in 1994 for petroleum exploration. The sonar surveys on BC caverns were performed on the dates as listed in Table 1.

Table 1. Date of the last sonar survey on BC caverns, cavern number, top and bottom elevations of the caverns.

| ID | Date of the sonar survey | Cavern/ Dome number | Top elevation (ft) | Bottom elevation (ft) |
|---|---|---|---|---|
| BC-1 | May 30, 1980 | 001 | −1040 | −1820 |
| BC-2 | Jul. 28, 1983 | 002 | −780 | −1520 |
| BC-3 | Jul. 13, 1977 | 003 | −1020 | −1840 |
| BC-4 | Jul. 30, 2013 | 004 | −640 | −1660 |
| BC-6 | Nov. 1, 2006 | 006 | −1240 | −1560 |
| BC-7 | Collapsed in 1954 | 007 | 0 | −1940 |
| BC-8 | May 31, 1980 | 008 | −1300 | −1940 |
| BC-10 | Sep. 13, 1973 | 010 | −1000 | −1880 |
| BC-11 | Mar. 10, 1978 | 011 | −1120 | −1740 |
| BC-13 | Aug. 13, 1977 | 013 | −1120 | −1860 |
| BC-15 | Apr. 15, 2009 | 015 | −2600 | −3260 |
| BC-16 | Jun. 28, 2004 | 016 | −2620 | −3200 |
| BC-17 | Apr. 16, 2009 | 017 | −2740 | −3960 |
| BC-18 | Jan. 6, 2009 | 018 | −2160 | −4160 |
| BC-19 | Apr. 14, 2009 | 019 | −2980 | −4200 |
| BC-20 | Dec. 13, 2013 | 020 | −3820 | −4180 |
| BC-24 | Apr. 16, 1997 | 024 | −3100 | −4320 |
| BC-25 | Oct. 30, 2007 | 025 | −2580 | −5640 |
| BC-26 | Oct. 11, 1996 | 026 | −2300 | −3320 |
| BC-27 | Oct. 28, 2007 | 027 | −5940 | −6280 |
| BC-28 | Oct. 29, 2007 | 028 | −4700 | −6240 |
| BC-J1 | Jul. 27, 2006 | 031 | −2860 | −3900 |
| BC-N1 | Dec. 5, 2003 | 032 | −1920 | −3480 |
| BC-UTP | Oct. 14, 2006 | 033 | −2380 | −3480 |
| BC-101 | Apr. 14, 2009 | 101 | −2580 | −4780 |
| BC-102 | Feb. 22, 2012 | 102 | −2640 | −5220 |
| Dome | | 999 | 0 | −6400 |

The cavern numbers are also defined in Table 1 to use in an input journal of a toolkit for robust generation of two- and three-dimensional finite element meshes (grids) and geometry preparation, such as, but not limited to CUBIT Geometry and Mesh Generation Toolkit by Sandia Corporation, which was used in this Example. The top and bottom elevations of each cavern are calculated in the resampling step discussed below. The data from the surveys are manipulated in a geologic modeling analysis and visualization software suit or tool, such as, but not limited to the Mining Visualization System (MVS) by C Tech Development Corp. This step is necessary to provide a full three-dimensional surface model of the sonar and seismic data.

The vertices output for the geomechanical simulations need to be at specific depth intervals which may not correspond to the actual sonar sampling locations. Continuous three-dimensional surface models of the survey data are created, which allows sampling at any needed depth. This resampling step is performed through an algorithm coded using Python. Then, the resampled node coordinates data sets for the dome and caverns are generated as the output in this step.

The resampled nodal data are converted into Cubit vertices data through MS Excel manipulation. 3D hexahedral element meshes for 26 caverns, salt dome, caprock, overburden, interbed, and interface between the dome and surrounding rock of BC SPR site, are constructed using various functions in Cubit. Mesh quality is checked for each block in Cubit. All meshes are combined into one hexahedral FE mesh, using a mesh combination program, such as GJOIN developed by Sandia Corporation. A solver for quasistatic nonlinear finite element program, such as ADAGIO developed by Sandia Corporation, will be executed with the mesh to calculate the geomechanical behavior of caverns, dome and surrounding lithologies.

Figure 4:
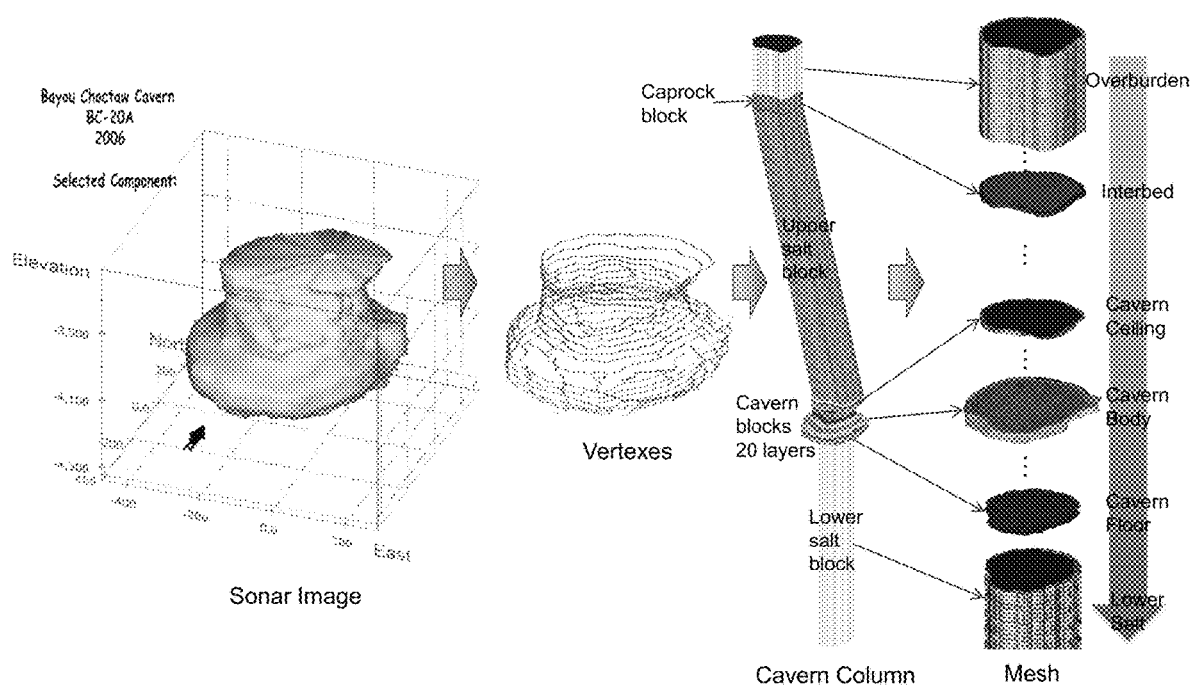
FIG. 4 shows work flow to create BC Cavern 20 mesh according to an embodiment of the disclosure.

FIG. 4 shows the procedure to create a cavern mesh of BC-20 as a further example. The sonar image of the cavern boundary including cavern ceiling, wall, and floor is obtained from the sonar survey. The 3D-coordinates of the vertices are resampled from the sonar image. Cavern slice block 20 ft thick layers are generated using the coordinates of vertices. The cavern mesh has to be composed of hexahedral elements. The hexahedral element shape has to be translated from the top through the bottom of the model. Therefore, the upper and lower salt blocks, interbed block, caprock block, and overburden block are needed.

The hexahedral element meshes are created in the overburden layer first. The quadrilateral element shapes on the top surface of the overburden block translate to the bottom surface of the block. The element shapes on the bottom surface of the overburden block transfer to the top surface of the caprock block through merging the surfaces. In the same manner, the hexahedral element shapes of the overburden block are translated through the interbed, upper salt, cavern ceiling, cavern body, cavern floor, and lower salt blocks. Those meshed blocks are assembled into the cavern column. The upper salt block leans to the left (west) because the dome leans to the west. To avoid poor shape elements in the salt between the dome edge and the upper salt block, the upper salt column needs to be parallel to the dome edge as much as possible. In the same manner, the other 26 cavern columns are generated for the remaining 26 caverns.

Figure 5:
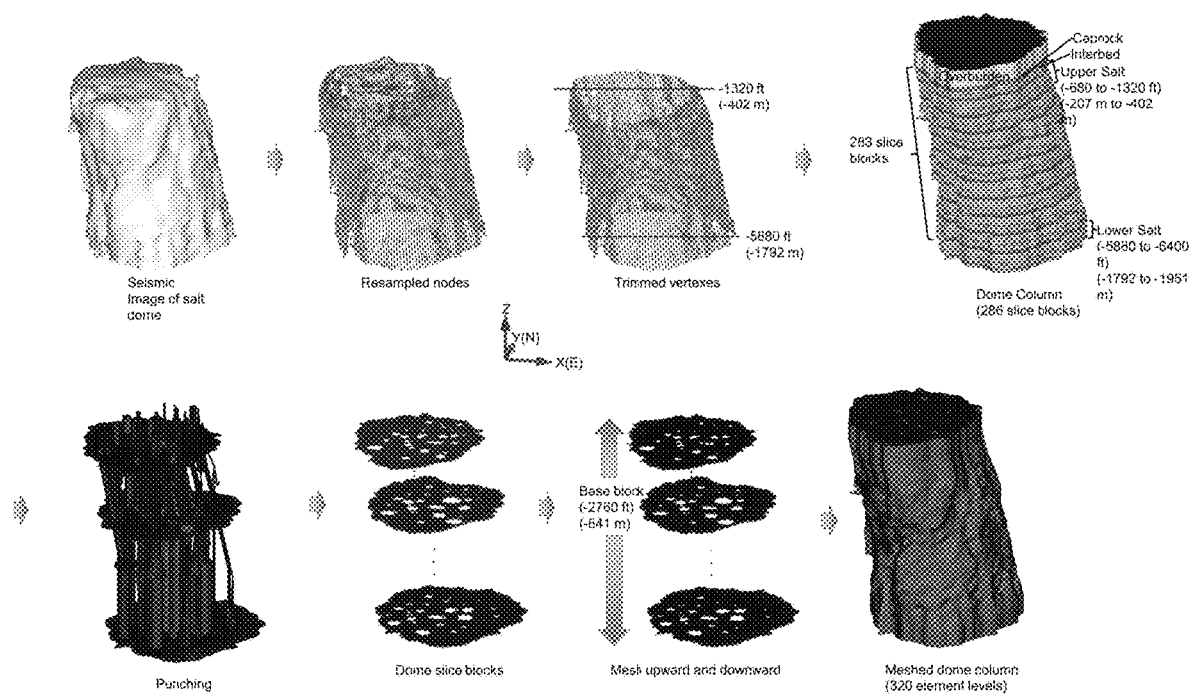
FIG. 5 shows work flow to create BC dome mesh according to an embodiment of the disclosure.

FIG. 5 shows the procedure to create the BC dome mesh. The 3D-coordinates of vertices are resampled from the seismic image. The dome mesh has to be composed of hexahedral elements. The hexahedral element shape has to be translated from the top through the bottom of the model. Therefore, the overburden block, caprock blocks, interbed block, upper salt blocks, and lower salt blocks have to be generated first. The vertex data for the upper salt blocks are translated upward from the vertex data of the trimmed salt dome top. The salt dome leans to the west. The coordinates of vertices at every 20 ft element level from elevations −1320 ft through −680 ft are calculated considering the leaning. The vertex data for the interbed, caprock, and overburden blocks are translated vertically upward from the vertices data of the top of upper salt blocks. 283 dome slice blocks with 20 ft thickness are created using the coordinates of vertices. Finally, the dome column consists of 286 slice blocks including the overburden block 500 ft thick, caprock block 160 ft thick, and bottom salt dome block 100 ft thick.

Each block is punched with 26 cavern columns which were generated in the previous section. The vertices data of each hole in the dome layer blocks are transferred from the cavern columns. The mesh will be created with the vertices of each hole and dome perimeter.

The hexahedral mesh in each block will be translated from over/under block. The cross-section areas of each cavern column and dome column are varied with depth. Considering the cross-sectional areas of the pillars between caverns; caverns and dome edge, the optimum base layer block is selected to avoid creating poor shape elements, so creating the number of poor shape elements in every layer block is as little as possible. The hexahedral element meshes are created at the base slice block which bottom is located at −2760 ft below the surface with 20 ft thickness. The quadrilateral element shapes on the top of the base slice block translate upward through the top of the dome column, and the element shapes on the bottom of the base layer block translate downward through the bottom of the dome column. 286 meshed layer blocks are assembled into the dome column which consists of 320 element levels (the height of dome column is 6400 ft). The dome leans to the west as shown in FIG. 5.

Figure 6:
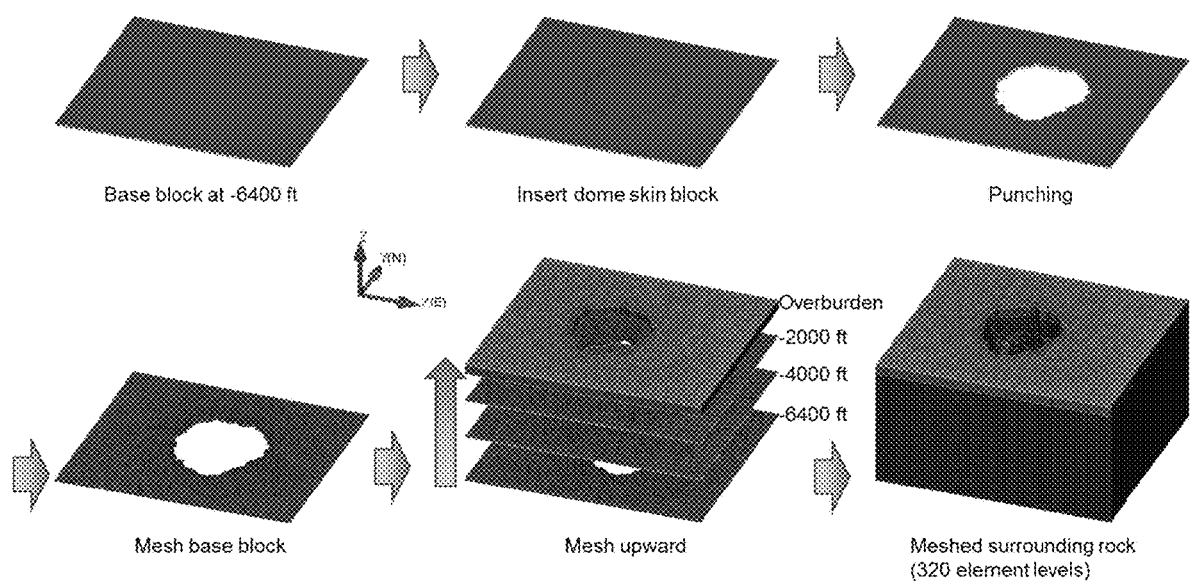
FIG. 6 shows work flow to create BC surrounding rock (far field) mesh according to an embodiment of the disclosure.
Figure 7:
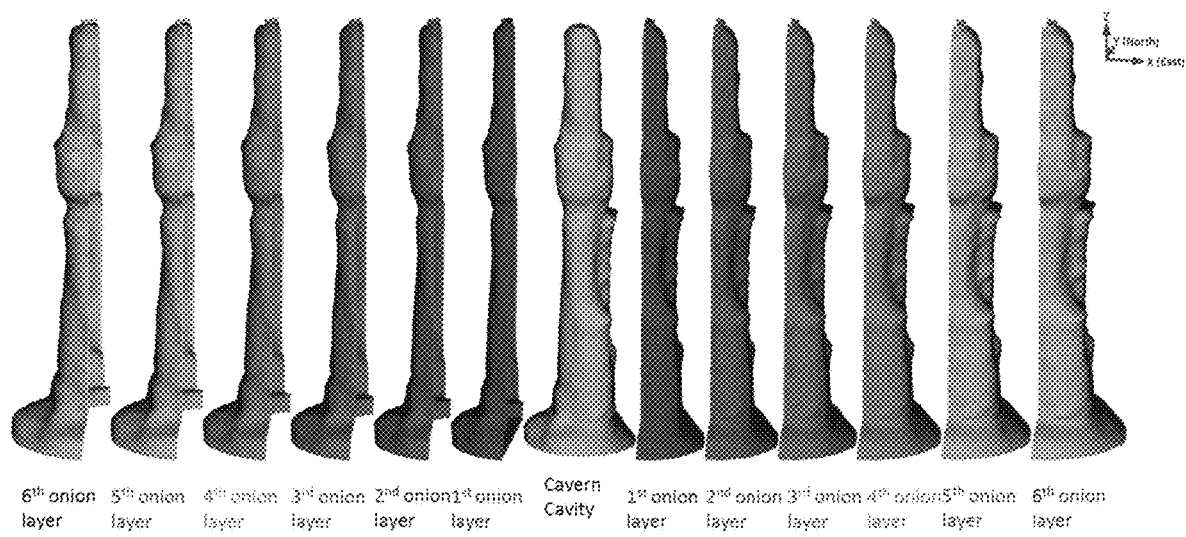
FIG. 7 shows BC Cavern 18 cavity with six drawdown onion layers according to an embodiment of the disclosure.

FIG. 6 shows the procedure to create the BC surrounding rock (far field) mesh. To represent the far field surrounding the BC dome, a rectangular brick, whose widths in E-W and N-S directions are two times the maximum widths of dome in the E-W and N-W directions, respectively, is created at −6400 ft depth. The rectangular brick is the base surrounding rock slice block whose thickness and bottom elevation are 100 ft and −6400 ft, respectively.

The bottom salt dome block, which was created in the previous section, is inserted into the base block and punched with the bottom salt dome block. The vertices data of the dome perimeter are transferred from the salt dome block. The number of intervals on E-W and N-S sides of the block is 20 which is selected as a balance number between the total number of elements and element shape. The number of intervals is one of key factors to determine the total number of elements in the model. Larger number of elements consumes more computer running time, but makes better mesh quality. The hexahedral element mesh is constructed with the vertices and the intervals. The thickness of each element layer sets up 20 ft in this model. The mesh has five element levels vertically because the thickness of the base block is 100 ft.

Figure 8:
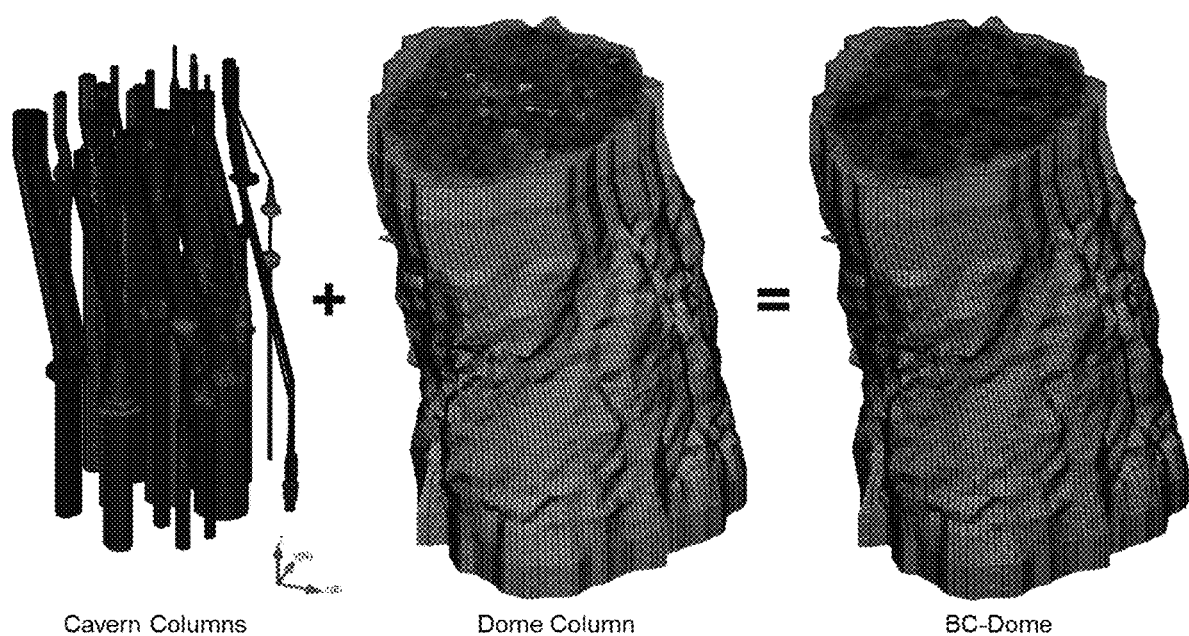
FIG. 8 shows cavern columns and dome column are combined into the dome.
Figure 9:
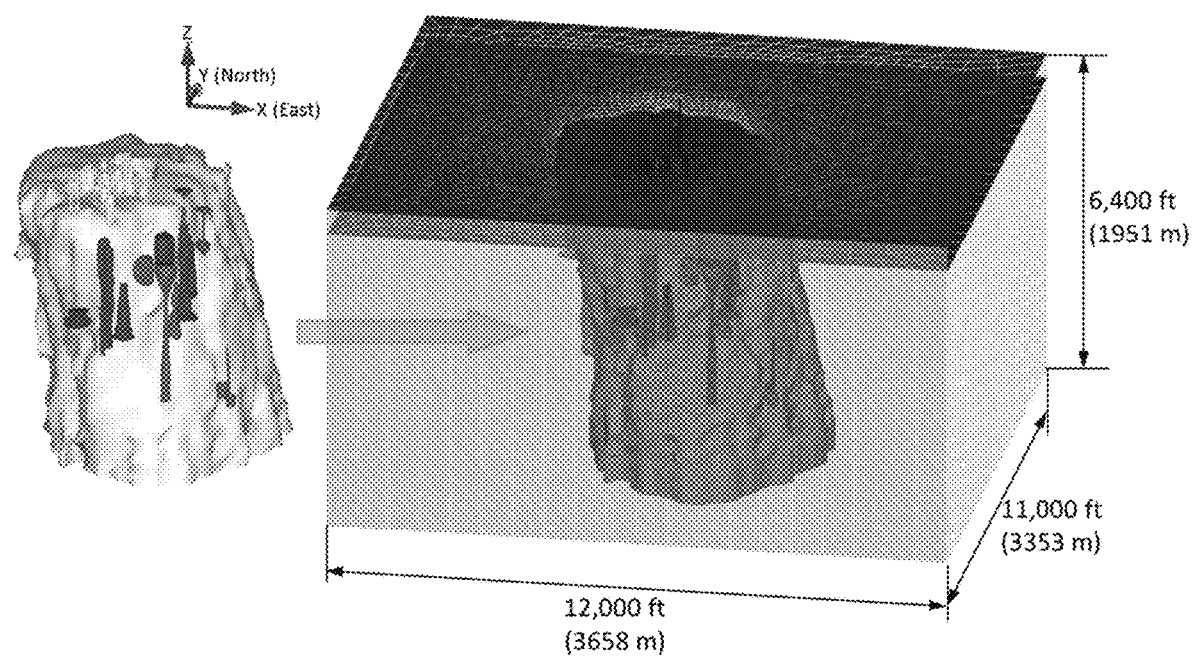
FIG. 9 shows the images of salt dome and caverns obtained from the seismic and sonar surveys, respectively (left) and the hexahedral elements mesh capturing realistic geometries of Bayou Choctaw Strategic Petroleum Reserve.
Figure 10:
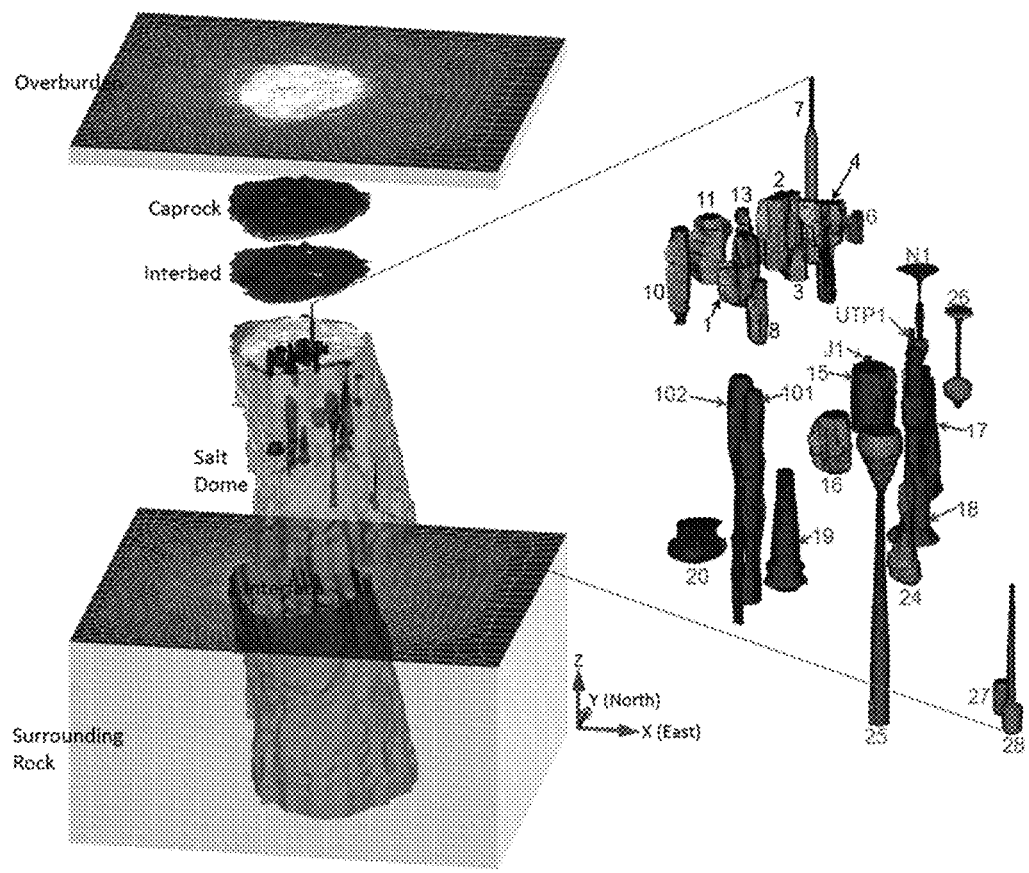
FIG. 10 shows overview of the hexahedral finite element meshes of the stratigraphy and cavern field at Bayou Choctaw. The U.S. Strategic Petroleum Reserve stores crude oil in the seven blue caverns. Green shows privately owned caverns, and grey depicts abandoned caverns. The cavern ID numbers are also shown.

In the similar manner, a rectangular block is created right above the base block. The top surface of the base block becomes the bottom surface of the new block. The vertices of four corners of the new block top are calculated considering the dome declination because the dome leans to the west. New blocks are constructed over the base block upward to the surface. Each layer block is assembled as the surrounding rock. As shown in FIGS. 4 and 5, twenty-six cavern columns and dome column are combined into the BC dome through the GJOIN process as shown FIG. 8. The dome and surrounding rock column created as shown FIG. 6 are combined into the entire mesh as shown FIG. 9 through the GJOIN process.

Representations of the Bayou Choctaw caverns based on sonar data were incorporated into the geomechanical model to provide a more realistic depiction of the caverns. To facilitate this, the cavern sonar data were resampled to a nodal spacing more appropriate for the geomechanical model. This process was implemented using a custom Python script which operated on ASCII files containing representations of the sonar data. The output from the script was an ASCII file containing X, Y, and Z locations of the newly determined nodal sites.

According to another embodiment of the invention, a computer program product is disclosed for performing the operations of the disclosed methods described in this disclosure.

In an embodiment, a computer program product is disclosed for performing the operations of the disclosed methods for creating a mesh representation of an object, body or space. In an embodiment, the computer program product is embedded within a non-transitory computer readable storage medium readable by a processor of a computer and configured to store instructions for execution by the processor for performing methods as described in this disclosure. Additional executable steps are as described in the method descriptions of this disclosure.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

A computing device can be used in accordance with the system and methodology disclosed herein. The computing device includes at least one processor that executes instructions that are stored in a memory. The memory may be or include RAM, ROM, EEPROM, Flash memory, or other suitable memory. The instructions may be, for instance, instructions for implementing functionality described as being carried out by one or more components discussed above or instructions for implementing the method described above. The processor may access the memory by way of a system bus. In addition to storing executable instructions, the memory may also store models of other operational elements.

The computing device additionally includes a data store that is accessible by the processor by way of the system bus. The data store may be or include any suitable computer-readable storage, including a hard disk, memory, etc. The data store may include executable instructions and/or models. The computing device also includes an input interface that allows external devices to communicate with the computing device. For instance, the input interface may be used to receive instructions from an external computer device, from a user, etc. The computing device also includes an output interface that interfaces the computing device with one or more external devices. For example, the computing device may display text, images, etc. by way of the output interface.

Additionally, while illustrated as a single system, it is to be understood that the computing device may be a portion of a distributed system. Thus, for instance, several devices may be in communication by way of a network connection and may collectively perform tasks described as being performed by the computing device. It is noted that several examples have been provided for purposes of explanation. These examples are not to be construed as limiting the hereto-appended claims. Additionally, it may be recognized that the examples provided herein may be permutated while still falling under the scope of the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system for fabricating a body, comprising:
a processor for executing programming;
a non-transitory computer readable storage medium encoded with the programming for creating a complex geometry, the non-transitory computer readable medium with programming configured to:
receive a mapping of a body;
create a finite element mesh representation of the body by the steps comprising:
dividing the body into slices; and
creating elements within the slices, wherein adjacent layers of elements are connected by common nodes;
a manufacturing system that receives the finite element mesh representation of the body and manufactures a part based on the created finite element mesh representation of the body.

2. The system of claim 1, wherein the manufacturing system is selected from a group consisting of 3D printing and machining.

* * * * *